Patented Apr. 1, 1952

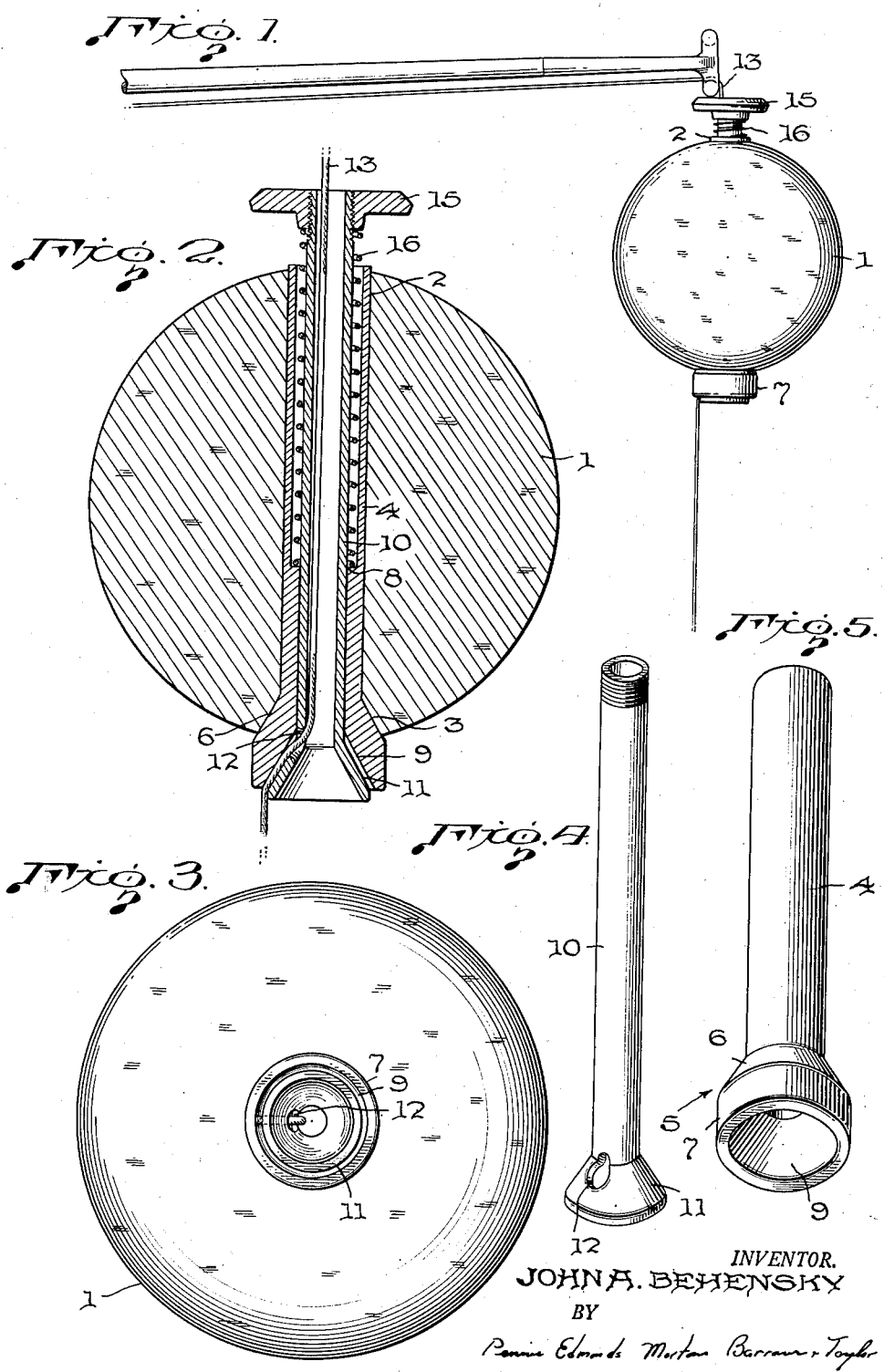

2,591,332

UNITED STATES PATENT OFFICE 2,591,332

FISHING FLOAT

John A. Behensky, Rockland Lake, N. Y.

Application February 19, 1951, Serial No. 211,632

8 Claims. (Cl. 43—44.88)

This invention relates to bobs or floats for use with fishing lines and more particularly to that type of float which is capable of securing and releasing a fishing line to permit adjusting the float in accordance with the depth of the water where it is to be employed.

There is a substantial demand for an adjustable fishing float that may be readily positioned at any point along a fishing line and which at the same time is practicable for use when fishing in water of a depth greater than the length of the fishing rod. Fishing in water of such depth presents a problem in the reeling in of the fish, since the line can be reeled to the rod only to the point where the float reaches the end of the rod. Consequently, the play of the fish upon the remaining portion of the line frequently causes difficulty in landing the fish, making it necessary to use a landing net.

Heretofore various types of fishing floats have been proposed to overcome the above problem, but they have not proven entirely satisfactory since they have been of such construction that adjusting them along a fishing line is a task rather than a simple operation. Moreover, they have not proven practicable for use where the fishing depth is greater than the length of the rod. Also floats of this character which have appeared on the market have been of such structure that they do not lend themselves to inexpensive manufacture.

It is an object of this invention to provide a fishing float of simple, unique structure which is readily adjustable along a fishing line, practicable for use in deep water fishing and which is inexpensive to manufacture, so that its retail price may be within the means of all fishing enthusiasts.

The fishing float of the instant invention comprises a buoyant body having a passage therethrough in which a tube is mounted for reciprocal movement. The tube has an opening in its lower wall portion to permit a fishing line to be passed through the tube and outwardly through the opening in its wall between cooperating surfaces of the tube and buoyant body. A spring tends to urge the tube in the buoyant body in a direction to bring the cooperating surfaces into engagement, whereby a fishing line passing between said cooperating surfaces will be yieldingly held against movement relative to the buoyant body.

In the preferred embodiment of the invention the wall surface of the passage extending through the float tapers outwardly at its lower end, and the tube extending through the passage has an outwardly flared end portion which is spring-urged toward the tapering wall surface of the passage, to provide cooperating surface areas to firmly grip the line, while omitting any danger of abrasion to the line caused by sharp contacting surfaces.

To adjust the float along a fishing line, it is simply necessary to overcome the force exerted by the cooperating surfaces against the line sufficiently to allow the float to be adjusted to a new position along the line. When landing a fish, the line may be reeled in to any desired extent since while the force with which the float is secured to the line is sufficient to normally retain the float in its adjusted position, it is insufficient to prevent the line from being pulled through the float when the float contacts the end of the fishing rod and no longer can travel with the line.

The novel features and advantages of the invention will become apparent from the following detailed description and accompanying drawings showing an illustrative form of a fishing float embodying the invention and wherein:

Fig. 1 is an elevational view showing the float of the invention in contact with the fishing rod when reeling in the line, Fig. 2 is a vertical sectional view of the float secured to the line at a predetermined position, Fig. 3 is a bottom view of the float, Fig. 4 is a perspective view of the hollow cylindrical tube, and Fig. 5 is a perspective view of the hollow cylindrical sleeve which extends through the float.

Referring to the drawings, the float comprises a bouyant body portion 1 which may be of cork, plastic, wood or other suitable bouyant material. While the float is shown in the drawings as being spherical in shape, it may be made in any other shape suitable for fishing floats. The body portion 1 has a cylindrical passage 2 extending diametrically therethrough to a point from whence it tapers outwardly as at 3 over the remaining portion of its length. A hollow cylindrical sleeve 4 having an enlarged lower end portion 5 is secured within the cylindrical passage 2. The upper portion of the outer surface of the enlarged lower end portion tapers outwardly and downwardly, as at 6, to a point where it again assumes a constant diameter over the remaining portion 7 of its length. The bouyant body 1 and the cylindrical sleeve 4 constitute a bouyant structure.

The tapering portion 6 of the sleeve 4 is seated against the tapering portion 3 of the body portion, and with the portion 7 of the sleeve extending outwardly from the surface of the body. The internal diameter of the cylindrical sleeve is constant throughout the upper portion of its length and then decreases in diameter to form a shoulder 8. The diameter then continues constant to a point relatively near its end from whence it increases to form a tapered seat 9.

A hollow cylindrical tube 10 having an outer diameter slightly smaller than the internal diameter of the lower portion of the cylindrical sleeve 4 is mounted within said sleeve for limited reciprocal movement. The lower end portion 11 of the cylindrical tube 10 is flared outwardly to provide a tapered portion which normally is seated against the tapered seat 9 of the cylindrical sleeve 4. The hollow cylindrical tube 10 is provided with an opening 12 in its wall at a point where the tube begins to flare outwardly, so that a fishing line 13 passing through the tube 10 may pass through the opening and between the tapered surfaces of the sleeve 4 and the tube 10.

The tube 10 is threaded at its upper end to receive a cap member 15. A spring 16 is positioned about the cylindrical tube 10 and bears against the cap member 15 and the shoulder 8 of the cylindrical sleeve 4 to exert an upward force on the tube 10, which urges the flared portion 11 thereof towards the tapered seat 9 of the sleeve 4 to firmly grip a line passing therebetween.

The force tending to move the flared portion 11 of the tube 10 towards the tapered seat 9 of the sleeve 4 may be adjusted by relatively positioning the cap member 15 on the tube 10 to either increase or decrease the tension of the spring 16.

To place the float on a line, the line is inserted into the cylindrical tube 10 and a force is then exerted on the upper side of the cap member 15, sufficient to overcome the force exerted by the spring 16 and to move the flared portion 11 of the tube 10 away from its seat. The line is then passed through the opening 12 in the tube 10 and between the tapered surfaces 9 and 11. The cap member 15 is then released to allow the spring 16 to again move the flared portion 11 of the tube 10 towards the tapered seat 9 of the sleeve 4 to firmly grip the line passing between them and thereby to secure the float against movement along the line.

To release the float from the line for the purposes of adjustment, it is only necessary to exert a force on the upper side of the cap member 15, sufficient to overcome the force exerted by the spring 16, thus causing the flared portion 11 of the tube 10 to move away from the tapered seat 9, and to release the line, allowing the float to be positioned at the desired point along the line.

An important advantage of the present invention is the ease with which the line may be reeled in, even when fishing in water of a depth considerably greater than the length of the fishing rod. During the reeling in, the float moves with the line until it reaches the end of the rod, then the line passes through the float and is wound on the reel. This is possible because the clamping force of the tapered surfaces on the line is sufficient to hold the float fixed relative to the line but insufficient to prevent the line from being drawn between the tapered surfaces of the float when it is held against movement by the end of the rod. Consequently, the line may be reeled in to a point where the fish is only a few inches from the end of the rod.

If desired, the float may be employed in a manner different from that described above. The line, instead of passing through the body portion and between the tapered surfaces, may simply be wound once or twice about the flared portion 11 of the tube 10. When the float is to be so used, it is only necessary to exert a force on the upper side of the cap member 15 sufficient to cause the flared portion 11 of the tube 10 to move away from the tapered seat 9 of the sleeve 4, a distance sufficient to allow the line to be wound once or twice about the flared portion 11. The force exerted on the upper side of the cap member 15 may then be removed and the flared portion will be urged against the tapered seat 9, thus securing the float against movement relative to the line.

It will be apparent that various changes may be made in the form, construction and arrangement of the parts without departing from the spirit and scope of the invention or sacrificing any of its material advantages, the form herein before described being merely a preferred embodiment thereof.

I claim:

1. A fishing float comprising a buoyant structure having a passage therethrough, a tube reciprocable within said passage and having an opening in its wall, said structure and the tube having cooperating surfaces, spring means tending to urge said tube in the buoyant structure in all positions of the float in a direction to bring said cooperating surfaces into engagement, whereby a line passing through the tube and the opening therein and between said cooperating surfaces will be resiliently held against movement relative to the buoyant structure.

2. A fishing float as defined in claim 1 having means to limit the reciprocable movement of the tube in said passage.

3. A fishing float as defined in claim 1 wherein the cooperating surface of the tube comprises an outwardly flared portion.

4. A fishing float as defined in claim 1 having a cap member secured to one end portion of said tube, a shoulder positioned on the internal wall surface of the passage, and said spring means bearing against said cap member and said shoulder to urge said cooperating surfaces together.

5. A fishing float as defined in claim 4 wherein said cap member is adjustably mounted on said tube, whereby the force exerted by said spring may be varied.

6. A fishing float as defined in claim 1 wherein the cooperating surface of the passage through the buoyant structure tapers outwardly.

7. A fishing float comprising a buoyant structure having a passage therethrough, the wall surface of said passage having a tapering portion, a tube extending through said passage and having a flared portion for seating against the tapered wall surface of said passage, said tube having an opening in its wall, spring means urging said flared portion of the tube towards said tapering portion of the wall surface of the buoyant structure in all positions of the float, whereby a line passing through the tube and through the opening therein and between said flared and tapered surfaces normally will be held against movement relative to the buoyant structure.

8. A fishing float comprising a buoyant body having a passage therethrough, a sleeve positioned within said passage, said sleeve having a portion of substantially constant internal diameter at one end thereof and an intermediate portion of a smaller, substantially constant diameter, a shoulder between said portions of different diameters, the internal wall surface of the sleeve adjacent the other end thereof tapering outwardly, a tube extending through said sleeve and having an outwardly flared portion adjacent one end thereof for seating against the tapered wall surface of said sleeve, a cap member adjustably mounted on the other end of the tube, said tube having an opening in its wall, spring means positioned about the tube and bearing against said shoulder and said cap member to urge said flared portion of the tube towards said tapering wall surface of the sleeve in all positions of the float, whereby a line passing through the tube and through the opening therein and between said flared and tapered surfaces normally will be gripped by said surfaces and held against movement relative to the buoyant body.

JOHN A. BEHENSKY.

REFERENCES CITED

The following references are of record in the file of this patent:

UNITED STATES PATENTS

| Number | Name | Date |
|---|---|---|
| 2,065,854 | Edel et al. | Dec. 29, 1936 |
| 2,493,971 | Johnson | Jan. 10, 1950 |
| 2,509,704 | Streitwieser | May 30, 1950 |